(12) United States Patent
Wagner et al.

(10) Patent No.: US 7,284,573 B2
(45) Date of Patent: Oct. 23, 2007

(54) HOSE FOR INSTALLING LOOSE FILL INSULATION

(75) Inventors: Christophe Wagner, Lansdale, PA (US); Edward Pentz, Boyertown, PA (US)

(73) Assignee: Certainteed Corporation, Valley Forge, PA (US)

(*) Notice: Subject to any disclaimer, the term of this patent is extended or adjusted under 35 U.S.C. 154(b) by 0 days.

(21) Appl. No.: 11/285,419

(22) Filed: Nov. 22, 2005

(65) Prior Publication Data

US 2006/0266429 A1 Nov. 30, 2006

Related U.S. Application Data

(63) Continuation-in-part of application No. 29/230,609, filed on May 24, 2005, now Pat. No. Des. 531,284, and a continuation-in-part of application No. 29/230,608, filed on May 24, 2005, now Pat. No. Des. 531,708, and a continuation-in-part of application No. 29/230,577, filed on May 24, 2005, now Pat. No. Des. 531,707, and a continuation-in-part of application No. 29/230,576, filed on May 24, 2005, now Pat. No. Des. 531,706.

(51) Int. Cl.
*F16L 11/11* (2006.01)

(52) U.S. Cl. ............... 138/129; 138/122; 239/302

(58) Field of Classification Search ........... 138/129, 138/122, 144, 149; 239/302
See application file for complete search history.

(56) References Cited

U.S. PATENT DOCUMENTS

| | | | |
|---|---|---|---|
| 2,430,081 A | 11/1947 | Roberts et al. | 156/144 |
| 3,112,771 A | 12/1963 | Bringolf | 138/129 |
| 3,243,328 A | 3/1966 | Britton et al. | 156/195 |
| 3,274,316 A | 9/1966 | Songer | 264/506 |
| 3,347,469 A | 10/1967 | Ross et al. | 239/424 |
| 3,428,093 A | 2/1969 | Guiles | 138/132 |
| 4,121,624 A | 10/1978 | Chen | 138/122 |
| 4,294,636 A | 10/1981 | Vitellaro | 156/143 |
| 4,303,104 A | 12/1981 | Hegler et al. | 138/121 |
| 4,337,800 A | 7/1982 | Carlson et al. | 138/122 |
| 4,420,019 A | 12/1983 | Dillon | 138/129 |
| 4,435,460 A | 3/1984 | Menzel | 428/129 |
| 4,490,575 A | 12/1984 | Kutnyak | 174/47 |
| 4,589,448 A | 5/1986 | del Valle | 138/122 |
| 4,865,255 A | 9/1989 | Luvisotto | 239/149 |
| 4,976,289 A | 12/1990 | Umemori et al. | 138/122 |

(Continued)

OTHER PUBLICATIONS

"PCT Notification of Transmittal of the International Search Report or The Declaration"—International Application No. PCT/US00/01331, (filed Jan. 20, 2000), Date of Mailing: Oct. 13, 2000.

*Primary Examiner*—Patrick F. Brinson
(74) *Attorney, Agent, or Firm*—Duane Morris LLP

(57) ABSTRACT

The present invention provides tubes for, in an exemplary embodiment, dispensing loose fill insulation. The tube comprises an inner web formed in a tubular shape and having a plurality of spaced helical projections disposed along an inner surface thereof and extending towards a central longitudinal axis of the inner web, the inner surface of the inner web also forming an inner surface of the tube. A cap is disposed around an outer periphery of the inner web. The helical projections serve to condition the insulation as the insulation passes through the tube.

20 Claims, 7 Drawing Sheets

U.S. PATENT DOCUMENTS

| | | | |
|---|---|---|---|
| 5,505,027 A * | 4/1996 | Young | 52/169.5 |
| 5,829,649 A | 11/1998 | Horton | 222/636 |
| 5,848,223 A | 12/1998 | Carlson | 392/478 |
| 5,992,465 A * | 11/1999 | Jansen | 138/37 |
| 6,152,186 A | 11/2000 | Arney et al. | 138/129 |
| 6,190,480 B1 | 2/2001 | Carlson | 156/143 |
| 6,206,050 B1 | 3/2001 | Kelley et al. | 138/129 |
| 6,401,757 B1 * | 6/2002 | Pentz et al. | 138/37 |
| 6,648,022 B2 * | 11/2003 | Pentz et al. | 138/37 |
| 6,719,864 B2 | 4/2004 | Kelley et al. | 156/143 |

* cited by examiner

HOSE FOR INSTALLING LOOSE FILL INSULATION

CROSS-REFERENCE TO RELATED APPLICATION(S)

This application is a continuation-in-part of commonly assigned U.S. Design patent application Ser. No. 29/230,576, now U.S. Design Pat. No. D531,706. entitled "Loosefill Insulation Hose with Different Sized Lips," of U.S. Design patent application Ser. No. 29/230,577, now U.S. Design Pat. No. D531,707, entitled "Loosefill Insulation Hose with Double Lips," of U.S. Design patent application Ser. No. 29/230,608, now U.S. Design Pat. No. D531,708, entitled "Loosefill Insulation Hose with Triple Lips" and of U.S. Design patent application Ser. No. 29/230,609, now U.S. Design Pat. No. D531,284, entitled "Loosefill Insulation Hose with Opposite Inclined Lips," to Christophe Wagner and Edward Pentz, each of which was filed May 24, 2005, the entirety of which are hereby incorporated by reference herein.

FIELD OF THE INVENTION

The present invention relates to hoses, and in particular, a hose for installing loose fill insulation.

DESCRIPTION OF THE RELATED ART

Loose fill insulation is packaged in bags in which the material becomes compacted during storage and shipment. When removed from the bags, the insulation separates into clumps. In order to effectively install the insulation material, it must first be "fluffed up" or conditioned to reduce its density. Traditionally, pneumatic devices are used to both install the insulation and perform the conditioning. The conditioning process breaks up the clumps and then "fluffs" or "opens up" the insulation. The conditioned insulation is then applied pneumatically to an area by blowing it through a hose connected to the pneumatic device. The insulation may be moistened and/or treated with an adhesive in the pneumatic device before installation.

FIGS. 1A and 1B show an example of a prior art pneumatic apparatus 10 for dispensing loose fill insulation. FIG. 1A is an isometric view of the apparatus 10, showing a hopper 16 for storing loose fill insulation, blower 22, and a hose 26 for dispensing the insulation. FIG. 1B is a side view of the apparatus 10 showing the inner workings in detail. The apparatus includes shafts 52, 60 with spikes 54, 62 extending therefrom for conditioning the insulation, which is placed in the hopper 16. The spikes 54, 62 break apart the clumps of insulation and prepare it to be dispensed. The conditioned insulation passes from the hopper 16 through the spikes 54, 62 to dispensing assembly 20, where it is blown through hose 26 by blower 22. In operation, the user simply points the hose 26 where the user desires the insulation, and it is dispensed.

Often, the conditioning which occurs within the insulation dispensing apparatus is not enough to fully "open up" the insulation. If the insulation is not sufficiently conditioned when it leaves the dispensing apparatus it may be applied unevenly (i.e. in clumps), and it may not have the manufacturer's specified density for the installed thermal resistance desired. Conversely, insulation which is well conditioned allows adhesive and moisture to penetrate the insulation fibers, and applies to surfaces more evenly.

Related U.S. Pat. Nos. 6,719,864 (the "'864 Patent") and 6,206,050 (the "'050 Patent"), which are commonly assigned with the present application and incorporated by reference herein in their entirety, describe improved hoses for use in installing loose fill insulation. The hose includes a projection extending from an inner surface which serves to condition the insulation as it proceeds through the hose and is dispensed. While this hose works well to improve the conditioning of the blow loose fill insulation, there is still a need for improvements for increasing the conditioning of loose fill insulation.

SUMMARY OF THE INVENTION

The present invention provides tubes for, in an exemplary embodiment, dispensing loose fill insulation. The tube comprises an inner web formed in a tubular shape and having a plurality of spaced helical projections disposed along an inner surface thereof and extending towards a central longitudinal axis of the inner web, the inner surface of the inner web also forming an inner surface of the tube. A cap is disposed around an outer periphery of the inner web. The helical projections serve to condition the insulation as the insulation passes through the tube.

The above and other features of the present invention are better understood from the following detailed description of the preferred embodiments of the invention which is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1A:
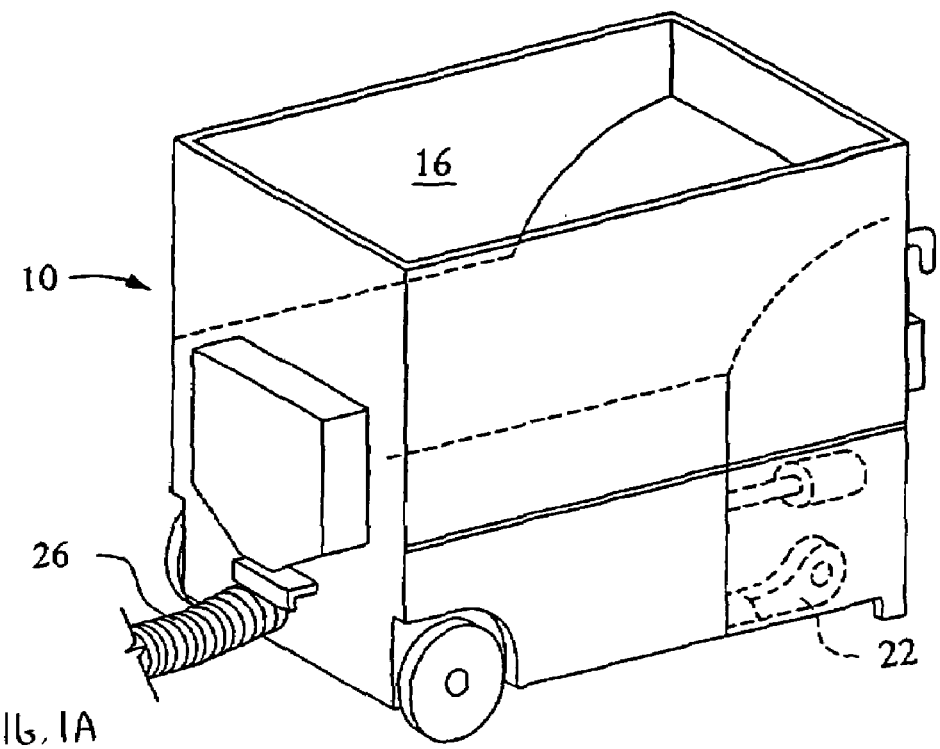
FIG. 1A is an isometric view of a conventional apparatus for dispensing loose fill insulation.
Figure 1B:
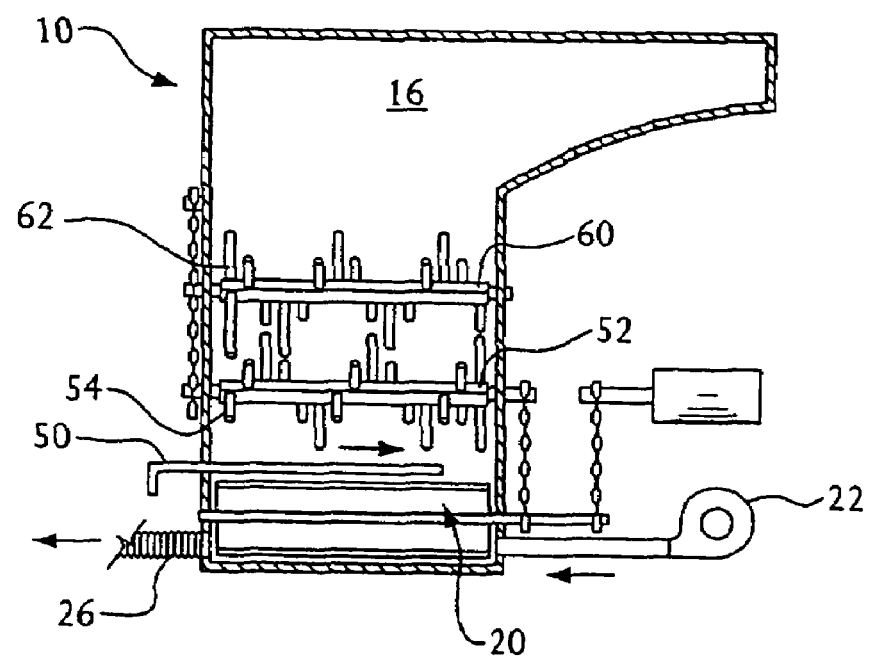
FIG. 1B is a cutaway side elevation view of the apparatus for dispensing loose fill insulation shown in FIG. 1A.

In a conventional insulation dispensing apparatus, such as the one described above and shown in FIGS. 1A and 1B, loose fill insulation is placed into a hopper or housing of the apparatus where it is conditioned. The apparatus typically includes a mechanism for conditioning the insulation, as well as means for dispensing the insulation, such as a hose or other similar means. Sometimes, however, the conditioning mechanism within the dispensing apparatus does not provide sufficient conditioning. An improved hose for, in an exemplary embodiment, dispensing loose fill insulation is provided. As described in more detail hereafter, the hose includes a tube comprising an inner web formed in a tubular shape and having a plurality of spaced helical projections disposed along an inner surface thereof and extending towards a central longitudinal axis of the inner web, the inner surface of the inner web also forming an inner surface of the tube. A cap is disposed around an outer periphery of the inner web. The helical projections serve to condition the insulation as the insulation passes through the tube.

Figure 2A:
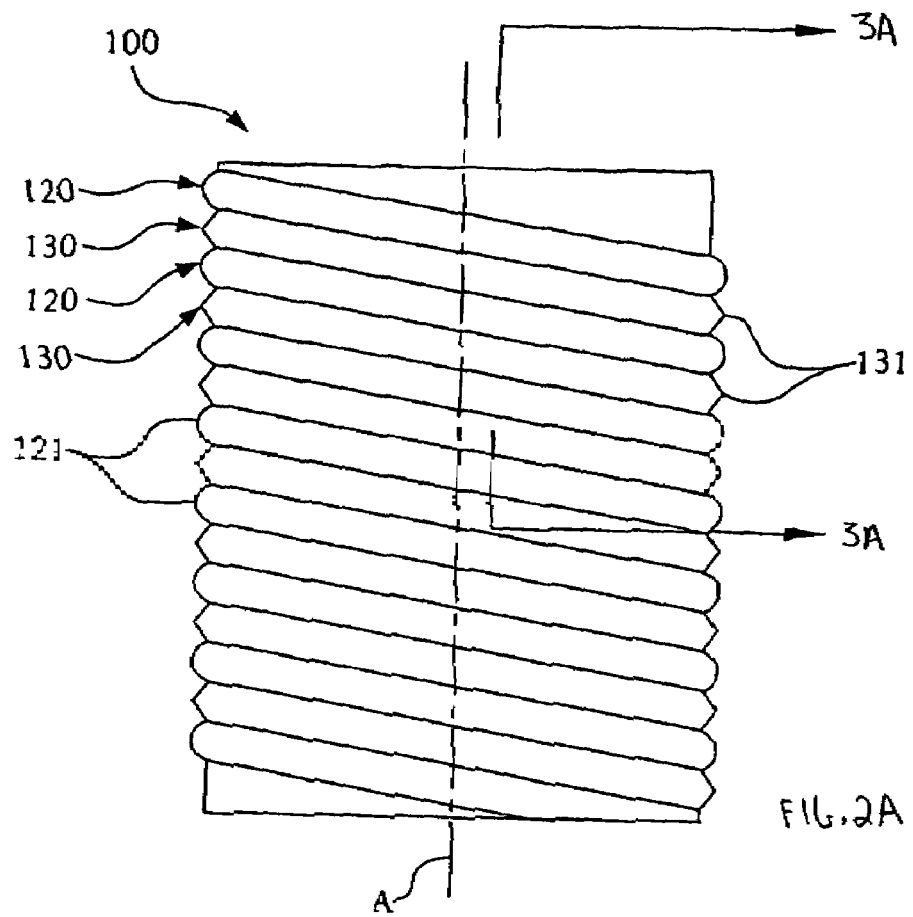
FIG. 2A is a front elevation view of the tube of the present invention.
Figure 2B:
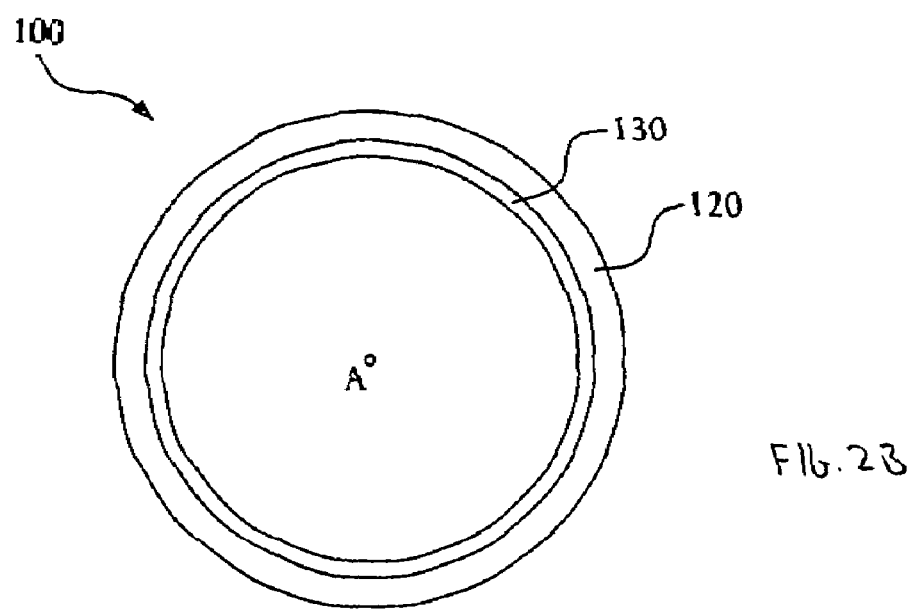
FIG. 2B is a top plan view of the tube of FIG. 2A.

Tube 100 for dispensing loose fill insulation is provided and preferably comprises a flexible hose coupled to an insulation dispensing apparatus. In FIGS. 2A and 2B, the tube 100 is formed as a cylindrical hose having an approximately circular cross-section. However, the tube 100 may have a cross-section of a variety of shapes (e.g. oval, rectangular, and polygonal) without departing from the scope of the invention. Further, although it is preferred that the tube 100 be used as a flexible external hose for an insulation dispensing apparatus, the tube 100 may be formed as an internal component in an insulation dispensing apparatus which is either rigid or flexible. Alternately, the tube 100 may comprise the inner liner of a hose.

The tube 100 comprises an inner web 130 surrounded by an outer cap 120. In the exemplary embodiment shown in FIGS. 2A and 2B, the inner web 130 is formed in a cylindrical shape, and the outer cap 120 is formed as a helical member extending around the outer periphery of the inner web 120 to seal the inner web. The inner web 130 includes a first helical projection 131 which extends around its entire outer periphery. The inner web 130 also includes a plurality of internal spaced, helical projections that extend around its inner periphery, which is shown specifically in FIGS. 3A-3D and described in more detail below. The first, outer helical projection 131 extends away from a longitudinal axis A of the inner web 130, and the plurality of inner, spaced helical projections extends towards the longitudinal axis A of the inner web 130. The outer cap 120 comprises a helical member 121 that is wound around the outer periphery of the inner web 130 and which is disposed at a position substantially aligned with the outer portions of the extrusion member forming inner web 130 and in between portions of the helical projection 131.

Figure 3A:
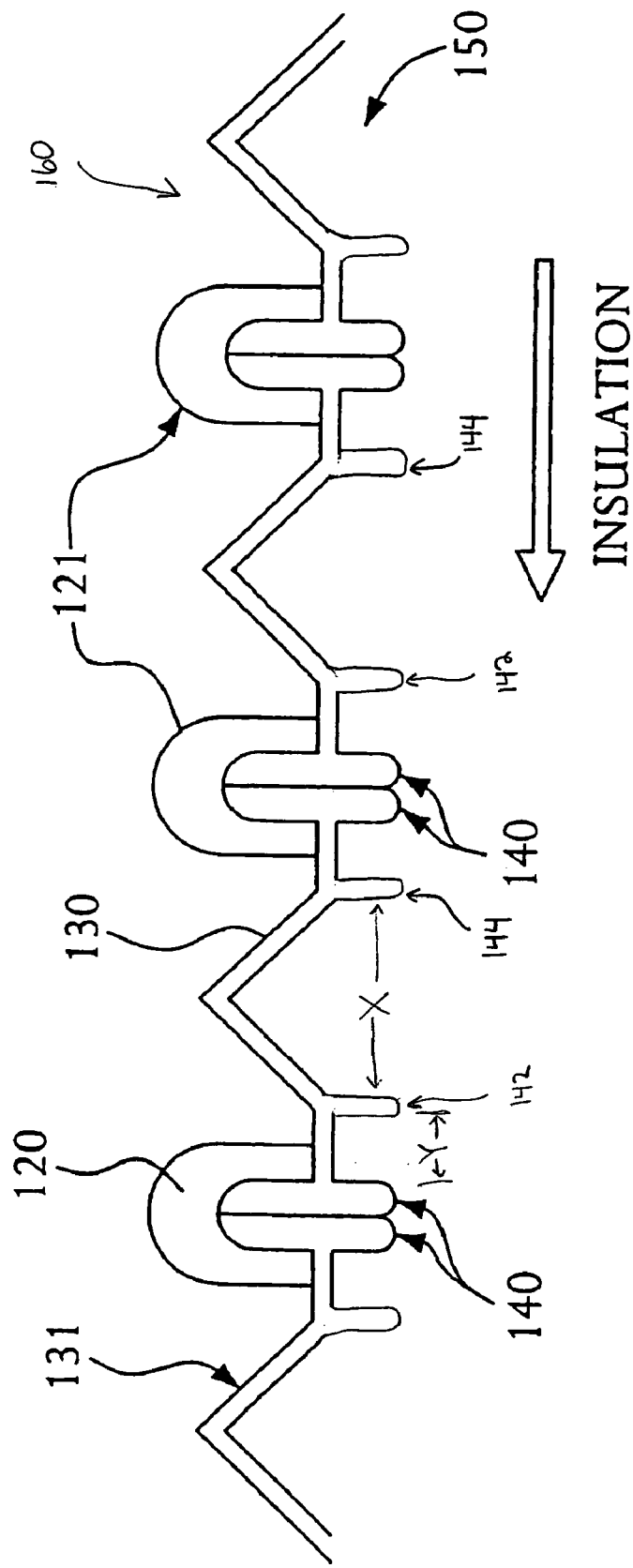
FIG. 3A is a cross-sectional view of the tube of the present invention with a plurality of spaced helical projections according to a first embodiment.

FIG. 3A shows a cross-sectional view of the tube 100 taken along section line 3A-3A in FIG. 2A. FIG. 3A shows a first embodiment of the plurality of helical projections. Reference numeral 150 indicates the inner portion of the tube 100 generally, and reference numeral 160 indicates an outer portion. Insulation (indicated by the arrow labeled "INSULATION") passes along inner portion 150 from the direction of insulation inlet and it is dispensed through the tube 100 from an insulation output. In this embodiment, the helical projections 140 of inner web 130 extend into the inner portion 150 of the tube 100 by a specific length, typically ¹⁄₁₀₀₀ of an inch (0.025 millimeters) to ¼ of an inch (6.35 millimeters), depending on the length of the insulation fiber and the diameter of the tube 100. They generally have a cross-sectional thickness of about 0.25 to 050 mm. The helical projections 140 substantially abut one another to collectively form a first helical projection (also referred to herein as "helical projection 140") extending into the inner portion 150. The tube also includes at least a second helical projection spaced from the helical projection 140. In the embodiment of FIG. 3A, the tube 100 includes second and third spaced helical projections 142, 144, respectively. These additional helical projections are preferably spaced from each other a distance "X" between about 6 to 10 mm. In one embodiment, the helical projections 142 and 144 are spaced a distance "Y" about 3 mm on either or both sides of projection 140. Thus, the spaced, helical projections 140, 142 and 144 provide multiple, small partial obstructions in the path of insulation traveling through the tube 100.

In operation, as insulation is blown through the tube 100 by an insulation dispensing apparatus, the insulation collides with the different portions of the multiple spaced helical projections 140, 142, 144, and is further "opened up" or conditioned. The individual fibers of the insulation are essentially "grabbed" by the projections 140, 142, 144 as they pass through the tube 100. As a portion of the fiber is attached to the projection 140, 142 or 144, the flow of air through the tube 100 causes the fiber to become stretched. This stretching action causes the insulation that exits the tube 100 at the insulation outlet (not shown) to be better conditioned (i.e. less dense) than the insulation that enters the tube at the insulation inlet (not shown). Accordingly, insulation installed using the tube 100 is less clumpy and adheres better to the surface to which it is applied than insulation installed by conventional hoses.

Figure 3B:
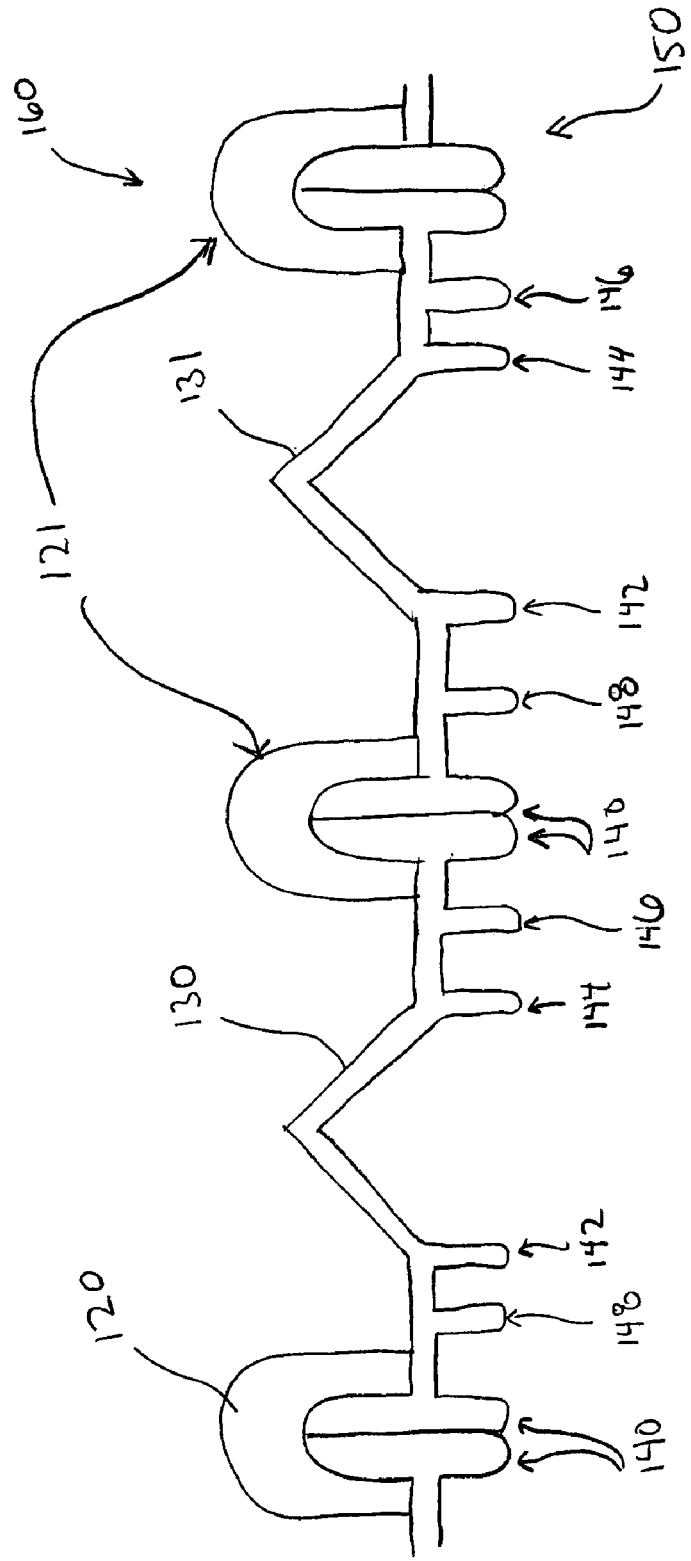
FIG. 3B is a cross-sectional view of the tube of the present invention with a plurality of spaced helical projections according to a second embodiment.

FIG. 3B illustrates that additional helical projections 148, 146 may be disposed between, and preferably equidistant from, projections 140, 142 and 140, 144, respectively.

Figure 3C:
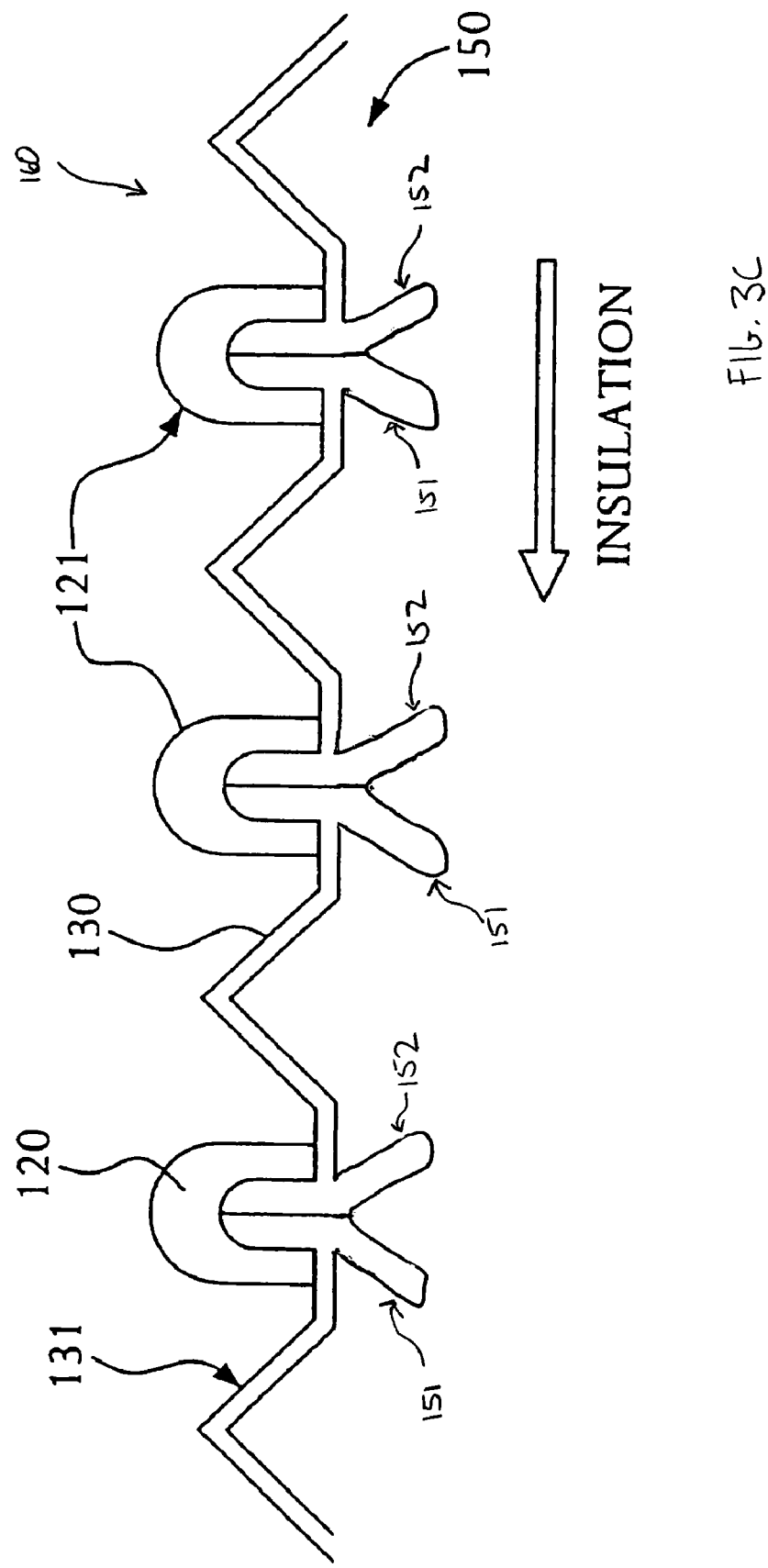
FIG. 3C is a cross-sectional view of the tube of the present invention with a plurality of spaced helical projections according to a third embodiment.

Although FIGS. 3A and 3B show the helical projections 140, 142, 144, 146, 148 as being substantially perpendicular to the axis A of the tube 100 (shown in FIG. 2A), other embodiments are also contemplated by the inventors. FIG. 3C shows a third embodiment where one or more helical projections (in this embodiment, the first and second spaced helical projections, now labeled 151, 152) are angled with respect to the axis A of the tube 100 by an angle less than ninety (90) degrees, and preferably at an angle between about 30-60°. A first exemplary projection 152 is angled so that it points towards the insulation input, i.e., the direction from which insulation flows through the tube in FIG. 3C. A second exemplary projection 151 is angled in the opposite direction, i.e., towards the output of the tube 100. The tips of these projections, i.e., the portions closest to longitudinal axis A, are spaced from each other, in an exemplary embodiment, a distance between about 0.25 inch, of course dependent upon the projection angle and length of the projections. Providing projections that are angled in opposite directions, and thus with and against the general insulation flow, may allow the projections to better grab for conditioning insulation flowing in the direction of the arrow of FIG. 3C and insulation moving in a backflow direction, such as due to turbulence in the tube 100.

The angling of the projection 151, 152 can be accomplished by extruding the inner web 130 with the angled projections. The process for extruding the inner web 130, as well as the fabrication process for the tube 100, is explained in detail in the commonly assigned '050 and '864 Patents, the entirety of which are hereby incorporated by reference herein.

Figure 3D:
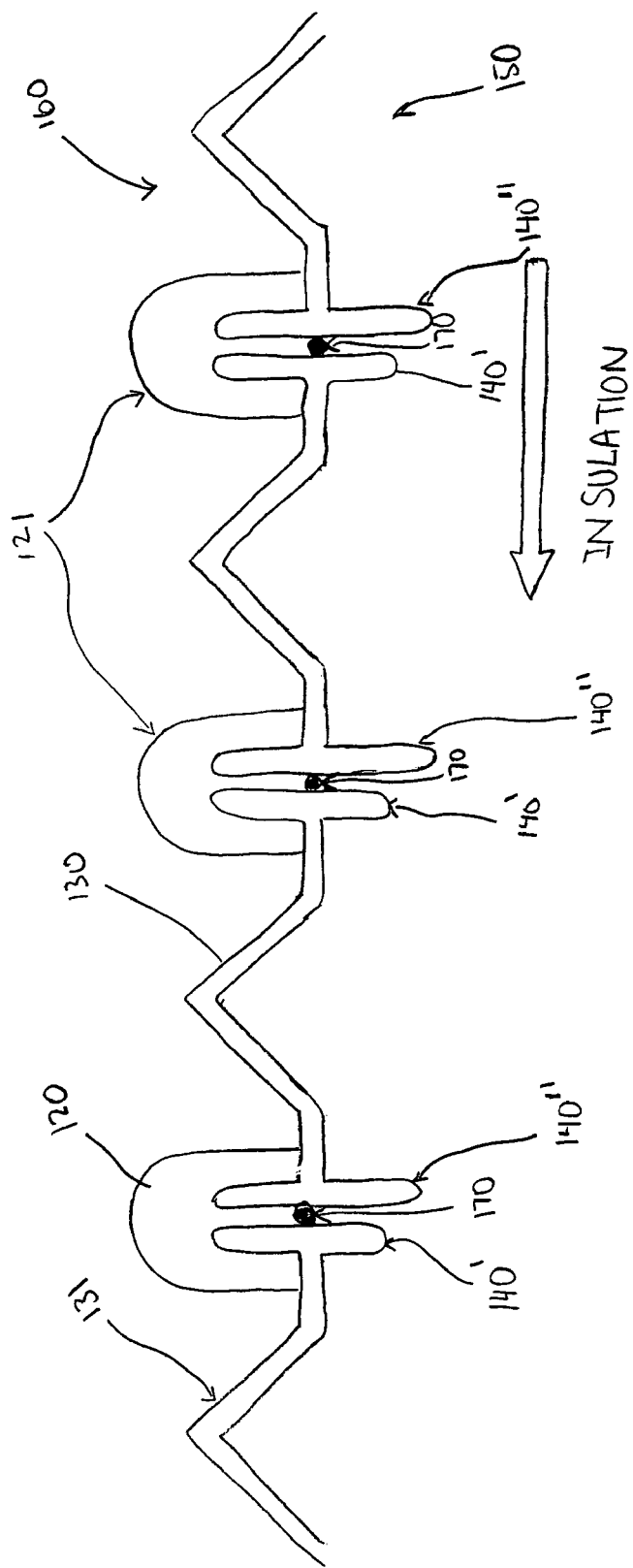
FIG. 3D is a cross-sectional view of the tube of the present invention with a plurality of spaced helical projections according to a fourth embodiment.

The helical projections need not project toward the longitudinal axis A for the same distance. FIG. 3D shows a fourth embodiment where the helical projections, now labeled 140' and 140", extend for different lengths. As also shown in FIG. 3D, adjacent turns of the tape that forms the tube 100 can be separated by a spacing element 170 disposed between the end portions of the tape. In one embodiment, spacing element 170 comprises and adhesive layer. In another exemplary embodiment, spacing element 170 comprises a portion of extruded cap 120 disposed between the end portions of the tape. In any event, the spacing created by spacing element 170 is preferably between about 0.5 to 3 mm.

Figure 4:
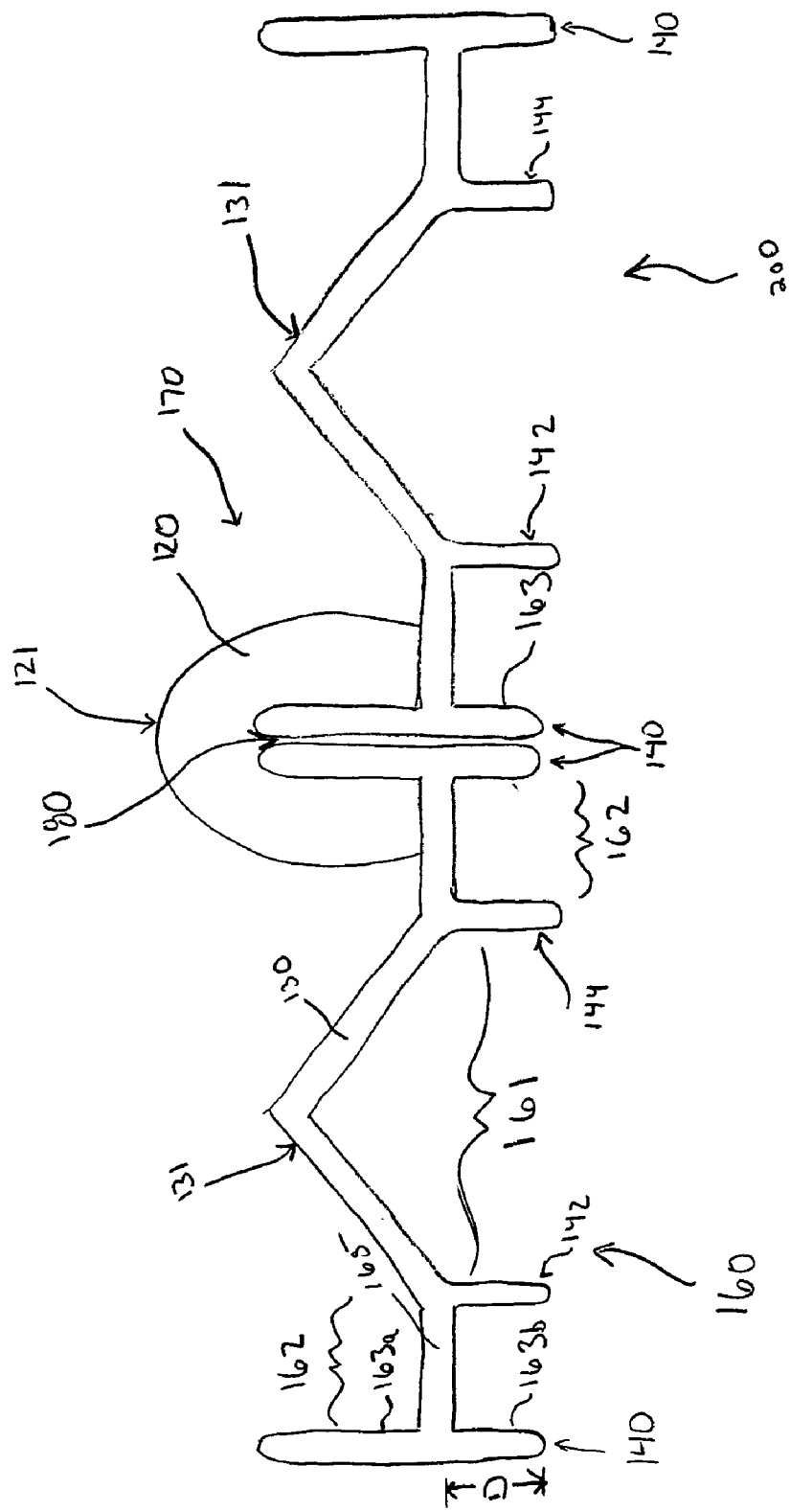
FIG. 4 is a cross sectional view of the tube showing how the webs are attached to one another.

FIG. 4 is a cross sectional view of the tube 100 showing how the inner web 130 (with helical projections 140, 142, 144) and outer cap 120 are formed. FIG. 4 shows an inner web 130 having a helical projection 140, 142, 144 as shown in FIG. 3A, but the foregoing explanation applies equally as well to embodiments shown in FIGS. 3B to 3D, with the exception being the provision of spacing element 170 in the embodiment of FIG. 3D. The materials for both the inner web 130 and outer cap 120 are preferably formed by extrusion of plastic through a die. The plastic may comprise any well known plastic in the art, for example, polypropylenes, urethanes, and polyvinyl chlorides may be used. However, these components need not be formed of strictly plastic, and may be formed of any suitable materials, including metals (e.g. aluminum), by any suitable process known to those skilled in the art. The inner web 130 is not formed as a cylindrical member as it is shown in FIGS. 2A and 2B. The web 130 is actually formed as a tape extrusion 200 with a generally W-shaped cross section as shown in FIG. 4. As described in detail in the '050 and '864 Patents, the tape 200 is wrapped around a cylindrical rotating mandrel to form the cylindrical inner web 130 shown in FIGS. 2A and 2B. The mandrel rotates in either the clockwise or counter-clockwise direction to roll the tape 200 onto its outer surface. FIG. 4 shows a cross section of two segments of the tape 200. Each segment of the tape 200 has a W-shaped cross section with an inverted V-shaped central portion 161, and two T-shaped outer portions 162. The central portion 161 of the W-shape, when wound around the mandrel, creates the first outward helical projection 131 of the tube 100, and outer portions 162 create the first inner helical projection 140. The outer portions 162 are preferably formed to have a horizontal section 165 coupling a vertical end portion to the central portion 161. A low portion 163b of the end portion extends below the central portion 161 by a distance D approximately ¹⁄₁₀₀₀ of an inch (0.025 millimeters) to ¼ of an inch (6.35 millimeters), depending on the length of the insulation fiber and the diameter of the tube 100, while the upper portion 163a extends above the horizontal portion 165. The projections 163b of the inner web tape 200 create the helical projection 140 when tape 200 is wound around the cylindrical mandrel.

The outer cap 120 is also formed from a tape-like extrusion 170. The outer cap tape 170, however, is formed to have an inverted U-shape. The outer cap tape 170 is formed to fit over sections 163a of the at least two outer portions 162 of the inner web tape 200 as shown in FIG. 4. The central open portion of the U-shape is approximately the same width and length as the combined width and length of the two adjacent portions 163a. A small gap 180 may exist between the adjacent outer portions 163a of the segments of tape 200. The outer cap tape 170 covers the two adjacent outer portions 162 and gap 180 such that the portions 163a substantially abut one another and thus holds the different segments of the inner web tape 200 together to form tube 100.

As stated above, the inner web 130 and outer cap 120 can be manufactured to have different configurations than the one shown in FIG. 4. The embodiment of FIG. 3C can be fabricated by extruding an inner web where the portions 163b of outer portions 162 of the inner web tape 200 are angled by an angle less than ninety (90) degrees with respect to the horizontal member 165. This involves merely changing the die used to extrude the inner web tape 200. The embodiment of FIG. 3D can be formed by changing the shape of the die used to extrude the outer cap tape 170 and by adding an adhesive layer.

In one embodiment, the outer cap tape 170 is secured to the inner web tape 200 by injecting molten plastic into the area around the cap as it is wound around the mandrel. The cap 120 is melted onto the web 130 at gap portions 180 formed between the segments of the tape as it is wound around the mandrel 200. Thus, the cap 180 seals the different segments of the inner web tape 160, and holds the tube 100 together. The shape of the tube 100 may be altered by simply changing the shape of the mandrel.

Although the above explanation describes the inner web 130 as being formed in a helical shape, it may be formed in other ways without departing from the scope of the invention. Instead of being formed as a continuous helical member, the inner web 130 may be formed by a series of non-continuous rings. The non-continuous rings may be formed by manufacturing the tube 100 as described above, and thereafter cutting the helical member, using for example a rotating knife die, at different portions so that a plurality of non-continuous rings are formed. The cross section of a tube 100 manufactured in such a manner would appear the same as the cross sections shown in FIGS. 3A-3D, the only difference being that the projections 140, 142, 144, etc. would comprise a plurality of parallel cylindrical projections rather than continuous projections.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A tube for dispensing loose fill insulation, comprising:
   an inner web formed in a tubular shape and having a plurality of spaced helical projections disposed along an inner surface thereof and extending towards a central longitudinal axis of the inner web, said inner surface of said inner web also forming an inner surface of said tube; and
   a cap disposed around an outer periphery of the inner web, wherein the helical projections condition the insulation as the insulation passes through the tube.

2. The tube of claim 1, wherein the projections extend away from the inner surface of the inner web between about 0.025 mm to 6.35 mm.

3. The tube of claim 1, wherein said plurality of spaced helical projections comprise:
   a first projection angled at an angle of less than 90° with respect to the longitudinal axis and oriented toward an insulation inlet of said tube; and
   a second projection angled at an angle of less than 90° with respect to the longitudinal axis and oriented toward an insulation outlet of said tube.

4. The tube of claim 1, wherein said plurality of spaced helical projections comprise at least first and second spaced projections substantially perpendicular with respect to the longitudinal axis.

5. The tube of claim 4, wherein one of said first and second spaced projections extend from the inner surface of the inner web for a distance greater than the other one of said spaced projections.

6. The tube of claim 1, wherein the inner web is formed from an extrusion comprising:
   a first central portion which is substantially V-shaped;

a second portion comprising two substantially horizontal members, each member attached to an opposing side of the first central portion; and a third outer portion comprising two end portions connected to the horizontal members, the horizontal members being disposed between the end portions, each end portion having an outer leg extending above the horizontal members, said outer legs being coupled to said cap.

7. The tube of claim 6, wherein each end portion further comprises an inner leg extending below said horizontal members, wherein said inner legs together form a first one of said plurality of spaced helical projections.

8. The tube of claim 7, wherein a second one of said plurality of spaced helical protrusions extends from one of said second portions and/or said first central portion.

9. The tube of claim 6, wherein each end portion further comprises an inner leg extending below said horizontal members, the extrusion further comprising a spacing element disposed between outer surfaces of said inner legs, wherein said inner legs form first and second projections from said plurality of spaced helical projections.

10. The tube of claim 9, wherein said spacing element comprises an adhesive.

11. The tube of claim 6, wherein each end portion further comprises an inner leg extending below said horizontal members, a first one of said inner legs angled at an angle less than 90° with respect to the longitudinal axis and oriented toward an insulation inlet of said tube, and a second one of said inner legs angled at an angle less than 90° with respect to the longitudinal axis and oriented toward an insulation outlet of said tube, wherein said inner legs form first and second projections from said plurality of spaced helical projections.

12. The tube of claim 1, wherein said cap comprises a helical extrusion disposed along the outer periphery of the inner web.

13. The tube of claim 1, wherein said plurality of spaced helical projections are spaced a in a range between about 6 to 10 mm.

14. An apparatus for dispensing loose fill insulation comprising:
    a container for storing and dispensing loose fill insulation; and
    a hose coupled to receive loose fill insulation from the container, the hose comprising a tube including:
        an inner web formed in a tubular shape and having a plurality of spaced helical projections disposed along an inner surface thereof and extending towards a central longitudinal axis of the inner web, said inner surface of said inner web also forming an inner surface of said tube; and
        a cap disposed around an outer periphery of the inner web, wherein the helical projections condition the insulation as the insulation passes through the hose.

15. The apparatus of claim 14, wherein said plurality of spaced helical projections comprise:
    a first projection angled at an angle less than 90° with respect to the longitudinal axis and oriented toward an insulation inlet of said hose; and
    a second projection angled at an angle less than 90° with respect to the longitudinal axis and oriented toward an insulation outlet of said hose.

16. The apparatus of claim 14, wherein said plurality of spaced helical projections comprise at least first and second spaced projections substantially perpendicular with respect to the longitudinal axis.

17. The apparatus of claim 16, wherein one of said first and second spaced projections extend from the inner surface of the inner web for a distance greater than the other one of said spaced projections.

18. The apparatus of claim 14,
    wherein the inner web is formed from an extrusion comprising:
        a first central portion which is substantially V-shaped;
        a second portion comprising two substantially horizontal members, each member attached to an opposing side of the first portion; and
        a third outer portion comprising two end portions connected to the horizontal members, the horizontal members being disposed between the end portions, each end portion having an outer leg extending above the horizontal members, said outer legs being coupled to said cap, and
    wherein each end portion further comprises an inner leg extending below said horizontal members, the extrusion further comprising a spacing element disposed between outer surfaces of said inner legs, wherein said inner legs form first and second projections from said plurality of spaced helical projections.

19. The apparatus of claim 14,
    wherein the inner web is formed from an extrusion comprising:
        a first central portion which is substantially V-shaped;
        a second portion comprising two substantially horizontal members, each member attached to an opposing side of the first portion; and
        a third outer portion comprising two end portions connected to the horizontal members, the horizontal members being disposed between the end portions, each end portion having an outer leg extending above the horizontal members, said outer legs being coupled to said cap, and
    wherein each end portion further comprises an inner leg extending below said horizontal members, wherein said inner legs together form a first one of said plurality of spaced helical projections.

20. A tube for dispensing loose fill insulation, comprising:
    an inner web formed in a tubular shape and having a plurality of spaced, parallel projections disposed along an inner surface thereof and extending towards a central longitudinal axis of the inner web, said inner surface of said inner web also forming an inner surface of said tube; and
    a cap disposed around an outer periphery of the inner web, wherein the projections condition the insulation as the insulation passes through the tube.

* * * * *